(No Model.)

L. W. TRUESDELL.
COMBINED VALVE AND VALVE SEAT.

No. 249,557. Patented Nov. 15, 1881.

Witnesses:
H. C. McArthur
S. S. Miller

Inventor:
Lewis W. Truesdell,
per Chas. H. Fowler
Attorney.

UNITED STATES PATENT OFFICE.

LEWIS W. TRUESDELL, OF OWEGO, NEW YORK.

COMBINED VALVE AND VALVE-SEAT.

SPECIFICATION forming part of Letters Patent No. 249,557, dated November 15, 1881.

Application filed August 9, 1881. (No model.)

*To all whom it may concern:*

Be it known that I, LEWIS W. TRUESDELL, a citizen of the United States, residing at Owego, in the county of Tioga and State of New York, have invented certain new and useful Improvements in Combined Valve and Valve-Seat; and I do hereby declare that the following is a full, clear, and exact description of the same, reference being had to the annexed drawings, making a part of this specification, and to the letters and figures of reference marked thereon.

Figure 1:
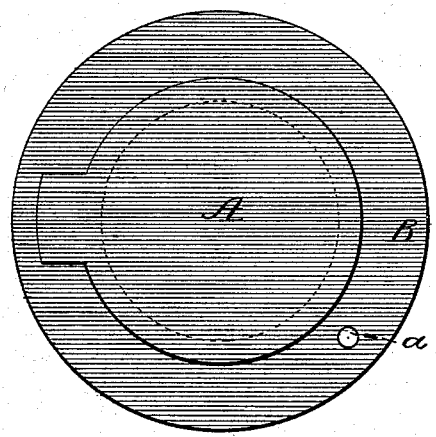
Figure 2:
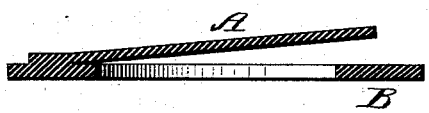

Figure 1 of the drawings is a top-plan view of my invention, and Fig. 2 is a sectional elevation thereof.

The present invention has relation to rubber or other flexible valves used in pump-tubes or other places where this class of valves are found useful; and it consists in a valve and valve-seat formed in one piece by molding it in suitable molds, as shown in the drawings and hereinafter described.

In the accompanying drawings, A represents the valve, and B the valve-seat, preferably of circular form, the diameter of the valve being greater than that of the opening in the seat, so that when closed the valve will bear down or come in contact with the seat around its inner edge.

In order to have the valve of the required weight to be self-closing, a metal disk may be connected thereto by suitable bolts or rivets.

The seat B is formed with a small opening, *a*, to allow the escape of the water back into the well during the winter or in cold weather; but in summer it may be stopped up by a suitable plug.

This valve and valve-seat are composed of rubber formed in suitable molds, and are of the same piece, there being no fastenings used to connect the two together.

Having now fully described my invention, what I claim as new, and desire to secure by Letters Patent, is—

As an improved article of manufacture, a combined valve and valve-seat formed of one and a single piece of rubber, substantially as and for the purpose set forth.

In testimony that I claim the above I have hereunto subscribed my name in the presence of two witnesses.

LEWIS W. TRUESDELL.

Witnesses:
C. A. CLARK,
G. W. BARNES.